United States Patent
Kljun et al.

(10) Patent No.: US 12,438,788 B2
(45) Date of Patent: Oct. 7, 2025

(54) MONITORING ENCRYPTED NETWORK TRAFFIC DATA

(71) Applicant: The Nielsen Company (US), LLC, New York, NY (US)

(72) Inventors: Anton Kljun, Bloke (SI); Joseph Kerkes, Lutz, FL (US); Julio Cesar Villasante, Westchase, FL (US); Marko Panger, Plavje (SI); Jernej Mihelj, Sezana (SI)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 18/512,398

(22) Filed: Nov. 17, 2023

(65) Prior Publication Data

US 2024/0171487 A1    May 23, 2024

Related U.S. Application Data

(60) Provisional application No. 63/427,442, filed on Nov. 22, 2022.

(51) Int. Cl.
*H04L 43/067* (2022.01)
*H04L 9/40* (2022.01)
*H04L 43/062* (2022.01)
*H04L 43/0876* (2022.01)
*H04L 43/12* (2022.01)

(52) U.S. Cl.
CPC .......... *H04L 43/067* (2013.01); *H04L 43/062* (2013.01); *H04L 63/0435* (2013.01)

(58) Field of Classification Search
CPC . H04L 43/067; H04L 43/062; H04L 63/0435; H04L 43/12; H04L 43/0876
See application file for complete search history.

(56) References Cited

U.S. PATENT DOCUMENTS

| | | | |
|---|---|---|---|
| 11,388,072 B2 * | 7/2022 | Wu | H04L 43/18 |
| 2020/0177966 A1 * | 6/2020 | Kerkes | H04H 60/31 |

* cited by examiner

*Primary Examiner* — Kamal M Hossain

(57) ABSTRACT

In one aspect, a method is described. The method includes detecting a first data packet transmitted through a wide area network (WAN), the first packet representing media presented at a client device of a plurality of client devices at a media exposure measurement location, each client device having a respective device identifier; detecting, within a monitoring interval, one or more second data packets transmitted through a local area network (LAN), each of the one or more second packets specifying a candidate device identifier, where the monitoring interval comprises a time window from the detection of the first packet; generating a score for each candidate device identifier based on a number of the second packets detected within the monitoring interval; based on the score, selecting, from the candidate device identifiers, a target device identifier; and storing data correlating the first packet with the target device identifier.

20 Claims, 7 Drawing Sheets

MONITORING ENCRYPTED NETWORK TRAFFIC DATA

CROSS-REFERENCE TO RELATED APPLICATIONS

This application claims the benefit of the filing date of U.S. Provisional Patent Application No. 63/427,442 for "METHODS, APPARATUS, AND ARTICLES OF MANUFACTURE TO MONITOR ENCRYPTED NETWORK TRAFFIC DATA," which was filed on Nov. 22, 2022, and which is incorporated herein by reference in its entirety.

FIELD OF THE DISCLOSURE

This disclosure relates generally to media monitoring and, more particularly, to methods, apparatus, and articles of manufacture to monitor encrypted network traffic data.

BACKGROUND

In recent years, methods of accessing media have evolved. For example, Internet media was primarily accessed via computer systems such as desktop and/or laptop computers. Recently, the advent of smart devices (e.g., televisions (TVs), smartphones, and streaming devices such as Roku®, Amazon Fire™ TV Stick, Google Chromecast™, Amazon Fire TV Cube, etc.) has allowed access to Internet media in ways that were previously unavailable. As used herein, the term "media" includes any type of content and/or advertisement delivered via any type of distribution medium. Thus, media includes television programming or advertisements, radio programming or advertisements, movies, web sites, streaming media, etc.

SUMMARY

In one aspect, a method for monitoring network traffic data at a media exposure measurement location is disclosed. The method includes detecting a first data packet transmitted through a wide area network (WAN), the first data packet representing media presented at a client device of a plurality of client devices at the media exposure measurement location, each client device of the plurality of client devices having a respective device identifier.

The method further includes detecting, within a monitoring interval, one or more second data packets transmitted through a local area network (LAN), each of the one or more second data packets specifying a candidate device identifier, wherein the monitoring interval comprises a time window from the detection of the first data packet.

The method further includes generating a score for each candidate device identifier based on a number of the one or more second data packets detected within the monitoring interval, based on the score, selecting, from the candidate device identifiers, a target device identifier, and storing data correlating the first data packet representing the media presented at the client device of the plurality of client devices at the media exposure measurement location with the target device identifier.

In a second aspect, there is provided a non-transitory computer-readable storage medium, having stored thereon machine-readable instructions that, upon execution by a processor, cause performance of operations of any preceding aspect.

In a third aspect, there is provided a computing system that includes a processor, and a non-transitory computer-readable storage medium, having stored thereon machine-readable instructions that, upon execution by the processor, cause performance of operations of any preceding aspect.

Figure 1:
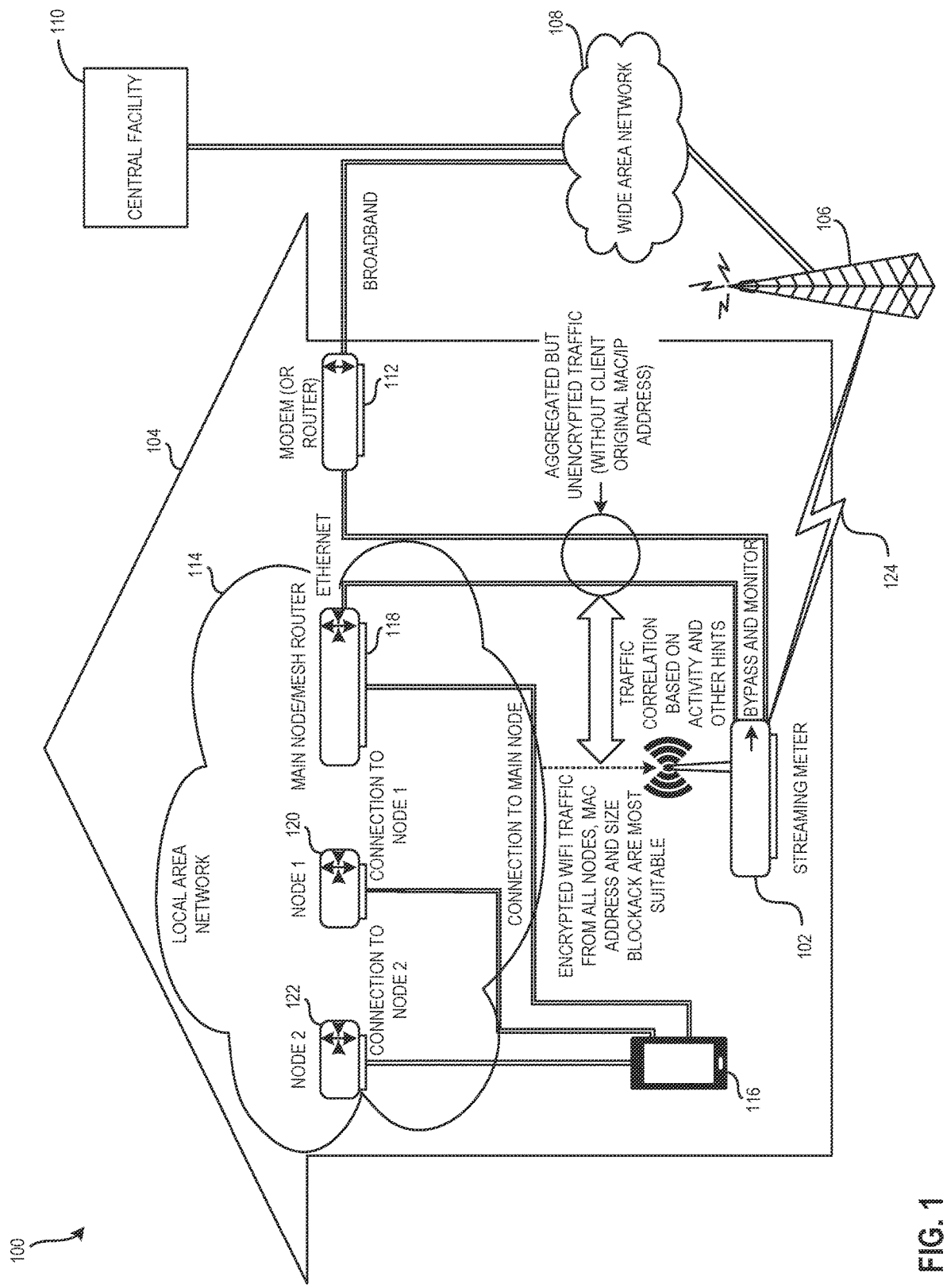
FIG. 1 is a block diagram of an example environment in which an example streaming meter monitors network traffic data.

In general, the same reference numbers will be used throughout the drawing(s) and accompanying written description to refer to the same or like parts. The figures are not to scale. As used herein, connection references (e.g., attached, coupled, connected, and joined) can include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" can be used to refer to an element in the detailed description, while the same element can be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general-purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that can instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU can be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that can assign computing task(s) to whichever one(s) of the multiple types of processor circuitry is/are best suited to execute the computing task(s).

DETAILED DESCRIPTION

In recent years, the use of media services (e.g., Netflix™, Hulu™, Prime Video™, HBO MAX™, Showtime™, etc.) has moved from almost exclusively on desktop and laptop computers to a wide variety of media presentation devices. Such media services can be accessed through many devices including televisions, smartphones, and streaming devices including Roku®, Amazon Fire® TV Stick, Google Chromecast®, and Amazon Fire® TV Cube. Media presentation devices include, for example, Internet-enabled televisions, personal computers, Internet-enabled mobile handsets (e.g., a smartphone), and tablet computers (e.g., an iPad®). In some examples, media can be streamed to a media presentation device from a streaming device. Streaming devices include, for example, video game consoles (e.g., Xbox®, PlayStation®) and digital media players (e.g., a Roku® media player, a Slingbox®).

To generate monitoring information related to streaming media, audience measurement entities (AMEs) monitor media streamed to desktop and laptop computers by monitoring the media presentation devices to which the media was being sent. In examples disclosed herein, monitoring information includes media identifying information (e.g., media-identifying metadata, codes, signatures, watermarks, and/or other information that can be used to identify presented media), application usage information (e.g., an identifier of an application, a time and/or duration of use of the application, a rating of the application, etc.), and/or user-identifying information (e.g., demographic information, a user identifier, a panelist identifier, a username, etc.). In some examples, media monitoring information is aggregated to determine ownership and/or usage statistics of media presentation devices, relative rankings of usage and/or ownership of media presentation devices, types of uses of media presentation devices (e.g., whether a device is used for browsing the Internet, streaming media from the Internet, etc.), and/or other types of media presentation device information.

To monitor streaming media, an AME can implement a streaming meter that is directly connected to a media presentation device. For example, a streaming meter monitors an access point (AP) (e.g., a router) in a household and the media streaming through the AP. As such, the streaming meter can monitor the media streaming to the laptop or desktop computer because the streaming meter only needs to monitor the network traffic data, such as the uniform resource locator (URL) for the media being presented or the Internet Protocol (IP) address for the media presentation device to which the media was sent. In some networking standards, network traffic data includes data packets that can be decrypted and used to determine the type of media streaming to a media presentation device.

However, modern wireless fidelity (WiFi) standards specify improved encryption techniques on local area networks (LANs) as compared to earlier WiFi standards. For example, WiFi 6, formally known as IEEE 802.11ax, is an emerging WiFi standard that utilizes the Wi-Fi Protected Access (WPA) 3 protocol to encrypt network traffic as compared to earlier WiFi standards which utilize the WPA2 protocol. According to the WPA3 protocol, session keys for WiFi sessions are derived in an irreversible manner whereas session keys derived according to the WPA2 protocol can be derived. As such, communications between an AP (e.g., a router) and a WiFi client device during WPA3 encrypted WiFi sessions cannot be decrypted.

For example, to monitor a WPA2 encrypted WiFi session, AMEs inject packets into the WPA2 encrypted WiFi session to request a WiFi client device to disconnect from an AP. The AME then observes the handshake protocol between the WiFi client device and the AP as the WiFi client device reconnects to the AP. Based on data gathered from observing the handshake, AMEs can derive the session key for the WPA2 encrypted WiFi session and decrypt network traffic between the AP and the WiFi client device. The above-described technique does not work for WPA3 encrypted WiFi sessions.

In addition to improved encryption protocols, modern WiFi standards also support mesh networking between wireless devices on a wireless LAN (WLAN). For example, IEEE 802.11 defines how wireless devices can interconnect to create a WLAN mesh network. A WLAN mesh network typically includes a main node and/or router that establishes a WLAN and mesh nodes that extend the WLAN beyond the range covered by the main node and/or router. Such mesh networks typically utilize backhauling to encapsulate network traffic from client devices. That is, mesh nodes transmit encrypted data between each other. For example, in addition to the password to enter the mesh network (e.g., password for the router and/or mesh nodes), network traffic is encrypted by another password (e.g., different from the password to enter the mesh network). Because of the additional encryption, some techniques are not suitable to monitor network traffic data on modern WiFi networks because the techniques cannot decrypt the data passing between mesh nodes.

For at least the above-described reasons, AMEs cannot accurately monitor network connected devices on modern WiFi networks. Examples disclosed herein include methods, apparatus, and articles of manufacture to monitor encrypted network traffic data. For example, disclosed methods, apparatus, and articles of manufacture correlate wide area network (WAN) traffic, which is unencrypted, with LAN traffic. For example, because WAN traffic is not encrypted, examples disclosed herein can analyze the contents of WAN traffic for audience measurement purposes. Additionally, because connections to WANs are wired, streaming meters disclosed herein do not require the most up-to-date WiFi cards to monitor network traffic data. Additionally, example streaming meters disclosed herein do not need to perform packet injection to identify the contents of network traffic.

FIG. 1 is a block diagram of an example environment 100 in which an example streaming meter 102 monitors network traffic data. The example environment 100 includes an example media exposure measurement location 104, an example wireless communication system 106, an example WAN 108, and an example central facility 110. The example media exposure measurement location 104 includes the example streaming meter 102, an example modem 112 (or router), an example LAN 114, and example one or more client devices 116. The example LAN 114 includes an example main node 118 (e.g., mesh router), an example first node 120, and example second node 122.

In the illustrated example of FIG. 1, the WAN 108 is communicatively coupled to the wireless communication system 106 and the modem 112 of the media exposure measurement location 104. The central facility 110 is communicatively coupled to the WAN 108. The wireless communication system 106 is communicatively coupled to the WAN 108. The wireless communication system 106 is communicatively coupled to the streaming meter 102 by an example communication link 124.

In the illustrated example of FIG. 1, the media exposure measurement location 104 is a panelist household. However, the media exposure measurement location 104 can be any other location, such as, for example an Internet café, an office, an airport, a library, a non-panelist household, etc. While in the illustrated example a single media exposure measurement location 104 is shown, any number and/or type(s) of media exposure measurement locations can be used. The panelist household can include one or more panelists. Panelists are users registered on panels maintained by a ratings entity (e.g., an AME) that owns and/or operates the ratings entity subsystem.

Traditionally, AMEs (also referred to herein as "ratings entities") determine demographic reach for advertising and media programming based on registered panel members. That is, an audience measurement entity enrolls people that consent to being monitored into a panel. During enrollment, the AME receives demographic information from the enrolling people so that subsequent correlations can be made between advertisement/media exposure to those panelists and different demographic markets. People (e.g., households, organizations, etc.) register as panelists via, for example, a user interface presented on a media device (e.g., via a website). People can be recruited as panelists in additional or alternative manners such as, for example, via a telephone interview, by completing an online survey, etc. Additionally or alternatively, people can be contacted and/or enlisted to join a panel using any desired methodology (e.g., random selection, statistical selection, phone solicitations, Internet advertisements, surveys, advertisements in shopping malls, product packaging, etc.).

In the illustrated example of FIG. 1, the streaming meter 102 of the media exposure measurement location 104 is communicatively coupled to the modem 112, the main node 118, and the LAN 114. For example, the streaming meter 102 is communicatively coupled to the modem 112 and the main node 118 via a wired (e.g., Ethernet) connection. Additionally, for example, the streaming meter 102 is communicatively coupled to the LAN 114 via a wireless (e.g., WiFi) connection.

In the illustrated example of FIG. 1, the LAN 114 implements a WLAN mesh network. For example, the main node 118, the first node 120, and the second node 122 are interconnected to form a WLAN mesh network. For example, the main node 118 is implemented by a router and the first node 120 and the second node 122 are implemented by WiFi extenders. In additional or alternative examples, the LAN 114 implements any other type of wireless LAN. In the example of FIG. 1, the one or more client devices 116 are coupled to the LAN 114 via one or more of the main node 118, the first node 120, or the second node 122. In the example of FIG. 1, each of the one or more client devices 116 can be registered to a respective panelist.

In the illustrated example of FIG. 1, the modem 112 is a device that enables media devices in the media exposure measurement location 104 to communicate with the WAN 108 (e.g., the Internet) via a broadband connection. In some examples, the WAN 108 can be implemented using any suitable wired and/or wireless network(s) including, for example, one or more data busses, one or more cellular networks, one or more private networks, one or more public networks, etc. The example WAN 108 enables streaming meter 102 to be in communication with the example central facility 110. In the example of FIG. 1, the main node 118 is implemented by a router. The example main node 118 hosts a WLAN to wirelessly connect the one or more client devices 116 to the WAN 108 via the modem 112.

In the illustrated example of FIG. 1, the streaming meter 102 is a device that monitors the network traffic data flowing through the modem 112 and/or the main node 118 and/or wireless network traffic in the LAN 114. In some examples, the streaming meter 102 is a single home unit and can have the functionality to collect network traffic data. In some examples, the streaming meter 102 is also configured to communicate with other devices in the media exposure measurement location 104. In the example of FIG. 1, the streaming meter 102 is configured to collect network traffic data from the modem 112, the main node 118, and/or the one or more client devices connected to the LAN 114.

For example, the streaming meter 102 collects one or more protocol data unit (PDU) packets transmitted to and/or from the modem 112. Additionally, the streaming meter 102 collects one or more packets transmitted in the LAN 114. As described above, the modem 112 is coupled to the WAN 108 and network traffic to and/or from the WAN 108 is not encrypted. As such, by collecting WAN packets (e.g., WAN PDU packets), the streaming meter 102 can identify the media presented via the LAN 114. However, network traffic to and/or from the WAN 108 does not specify the media access control (MAC) address of client devices to and/or from which the WAN traffic is being transmitted. For example, this is due to network address translation (NAT) techniques performed by the main node 118. As such, the streaming meter 102 cannot determine demographics for the identified media presented via the LAN 114.

To identify which of the one or more client devices 116 accessed a detected WAN packet, the streaming meter 102 and/or the central facility 110 can correlate the WAN packet with a MAC address of one or more packets transmitted in the LAN 114 within a threshold amount of time (e.g., monitoring interval) after the WAN packet. For example, in FIG. 1, the streaming meter 102 monitors (e.g., via a wireless connection) control packets transmitted in the LAN 114 within a threshold amount of time (e.g., monitoring interval) after a WAN packet is detected to identify MAC addresses of the one or more client devices 116 associated with the control packets. The streaming meter 102 can correlate the timing of the control packets with the detection of WAN packets (e.g., detected via a wired connection).

In examples disclosed herein, any packet type can be used for detection of packets on the LAN 114. However, utilizing control packets is preferable because control packets provide the added benefit of large coverage area for the streaming meter 102. For example, control packets are transmitted on the based band at a low data rate. Additionally, utilizing control packets does not require the use of WiFi cards that support the latest WiFi standards. In the example of FIG. 1, the streaming meter 102 monitors for BlockACK control packets and RTS/CTS control packets.

In the illustrated example of FIG. 1, the one or more client devices 116 include a device that can receive any type of media and present the media. For example, the one or more client devices 116 can be, for example, an Internet-enabled television, a personal computer, an Internet-enabled mobile handset (e.g., a smartphone), a tablet computer (e.g., an iPad®), etc. The one or more client devices 116 can present media sent from a streaming device via a wired or wireless connection to the streaming device, a wired or wireless connection to a media service provider, etc. The one or more client devices 116 can present the media streaming to the one or more client devices 116 from the streaming device with supplementary media presentation devices such as speakers, projectors, additional screens, etc.

In some examples, the streaming meter 102 can be unable to transmit information to the central facility 110 via the modem 112. For example, a server upstream of the modem 112 might not provide functional routing capabilities to the central facility 110. In the illustrated example of FIG. 1, the streaming meter 102 includes additional capabilities to send information through the wireless communication system 106 (e.g., the cellular communication system) via the communication link 124. The communication link 124 of FIG. 1 are cellular communication links. In additional or alternative examples, any other method and/or system of communication can be used such as, for example, and Ethernet connection, a Bluetooth connection, a Wi-Fi connection, etc. Further, the communication link 124 of FIG. 1 implements a cellular connection via a Global System for Mobile Communications (GSM). However, any other systems and/or protocols for communication can be used such as, for example, Time Division Multiple Access (TDMA), Code Division Multiple Access (CDMA), Worldwide Interoperability for Microwave Access (WiMAX), Long term Evolution (LTE), etc.

In the illustrated example of FIG. 1, the central facility 110 is a server that collects and processes media monitoring information from the streaming meter 102 to generate exposure metrics related to presented media. The central facility 110 analyzes the media monitoring information to identify panelists corresponding to client devices that received and/or requested media via the LAN 114 as described above. From these metrics, the central facility 110 determines which media presentation devices are the most owned, the most-frequently used, the least-frequently owned, the least-frequently used, the most/least-frequently used for particular type(s) and/or genre(s) of media, and/or any other media statistics or aggregate information that can be determined from the data. The media presentation device information can also be correlated or processed with factors such as geodemographic data (e.g., a geographic location of the media exposure measurement location, age(s) of the panelist (s) associated with the media exposure measurement location 104, an income level of a panelist, etc.) Media presentation device information can be useful to manufacturers and/or advertisers to determine which features should be improved, determine which features are popular among users, identify geodemographic trends with respect to media presentation devices, identify market opportunities, and/or otherwise evaluate their own and/or their competitors' products.

In the illustrated example of FIG. 1, the central facility 110 can receive and/or obtain Internet messages (e.g., a HyperText Transfer Protocol (HTTP) request(s)) that include the metering information. Additionally, or alternatively, any other method(s) to receive and/or obtain metering information can be used such as, for example, an HTTP Secure protocol (HTTPS), a file transfer protocol (FTP), a secure file transfer protocol (SFTP), etc.

In example operation, a client device of the one or more client devices 116 accesses a web page. Based on the request from the client device, multiple sessions are established in parallel between the client device and a server hosting the web page. For example, many sessions are established in parallel to render the web page with low latency. If the web page does not host streaming media, the multiple sessions usually end shortly after the web page is rendered. However, if the web page hosts streaming media, some sessions persist as data is streamed from the server hosting the web page to the client device.

For such a longer-lasting session, the streaming meter 102 identifies each WAN packet that is received during the longer-lasting session and generates a score for each MAC address that was detected during a threshold period after receiving the WAN packet. When the session concludes (or after a threshold number of monitoring intervals), the streaming meter 102 computes a composite score for each MAC address and determines that the MAC address with the highest composite score for the session is correlated to the WAN packets.

In examples disclosed herein, both inbound and outbound traffic can be used for correlation purposes. For example, inbound traffic corresponds to network traffic transmitted to the one or more client devices 116. Additionally, for example, outbound traffic corresponds to network traffic transmitted from the one or more client devices 116 to another device. Example inbound traffic is periodic and denser when media is being streamed (e.g., streaming media to a device and browsing the web are essentially downloading web content to a WiFi client device, at least from the perspective of the client device). Additionally, example outbound traffic is often initiated by a user action. For example, a user can select a video clip, access a web page, etc. As such, outbound traffic is sparse in time (e.g., infrequent). Example outbound traffic results in a higher number of unique correlations under WAN traffic analysis techniques disclosed herein.

As described above, whether the streaming meter 102 correlates a detected WAN packet with a client device detected for a monitoring interval depends on a score the client device receives for the monitoring interval. In the example of FIG. 1, when a WAN packet is detected during a WiFi session, the streaming meter 102 identifies whether any control packets were detected in a monitoring interval after the time of reception of the WAN packet. For example, the streaming meter 102 identifies control packets and associated MAC addresses that have been received within a threshold amount of time of the WAN packet.

In the illustrated example of FIG. 1, for each MAC address, the streaming meter 102 computes a score based on the number of control packets detected corresponding to that MAC address during the monitoring interval. For example, for a MAC address, the score is computed as the count of packets corresponding to the MAC address that were detected during the monitoring interval. This process is described in more detail below with reference to FIG. 6. Scores can be categorized as plain or unique scores. For example, a plain score corresponds to a score for a MAC address corresponding to a packet that was received during a monitoring interval with packets corresponding to other MAC addresses. A unique score corresponds to a score for a MAC address corresponding to a packet that was the only MAC address corresponding to packets received during the monitoring interval.

In the illustrated example of FIG. 1, after the session concludes (or after a threshold number of time windows in a monitoring interval), the streaming meter 102 can compute composite scores for each MAC address detected during the session. For example, the streaming meter 102 computes the composite score as illustrated in Equation 1 below. In Equation 1, the plain and unique scores are weighted.

$$Score_{Composite} = (w_1 * Score_{Plain}) + (w_2 * Score_{Unique}) \quad \text{(Equation 1)}$$

$w_1 = 0.3$
$w_2 = 0.7$

To adjust the weighting in Equation 1, data can be collected from the LAN 114 when the LAN 114 is in an unencrypted mode of operation. From this data, a true mapping of WAN packets to MAC addresses can be determined. From this truth data, the streaming meter 102 can adjust the weights until correlation is within a threshold amount of error to the truth data obtained from the unencrypted mode operation. Additionally or alternatively, Equation 1 can be subdivided into a first composite score for inbound traffic and a second composite score for outbound traffic. In such examples, the second composite score for outbound traffic is weighted more heavily than the first composite score for inbound traffic.

Additionally, in some examples, the streaming meter 102 filters network traffic data corresponding to wired connections from collected network traffic data (e.g., the streaming meter 102 ignores packets from sessions related to wired devices). For example, the streaming meter 102 identifies wired connections based on a wired Ethernet connection to the streaming meter 102. For example, the IP and/or MAC addresses of devices connected to the streaming meter 102 via a wired connection is stored in a first mapping table and the streaming meter 102 removes network traffic data corresponding to the IP and/or MAC addresses before performing disclosed WAN traffic analysis techniques.

Additionally, for example, the streaming meter 102 filters network traffic data corresponding to wired connections from collected network traffic data based on metadata included with packets. For example, when the main node 118 performs NAT techniques, software installed on the main node 118 generates a second mapping table that translates packets from the WAN format to wireless ports of the main node 118. Based on the two mapping tables, the streaming meter 102 identifies packets corresponding to wired connections and ignores the identified packets during correlation analysis.

As used herein, the term "network traffic data" includes a variety of metrics of a network device and/or network traffic including IP addresses, MAC addresses, URLs, domain names, Multipurpose Internet Mail Extension (MIME) types, bandwidth, duration of events, count of events, timestamps corresponding to when a packet was detected by a device, etc. Duration of events may refer to the amount of time that a session between a host device (e.g., a router) and a client device exists. Count of events may refer to the number of communications between a client device and a host device to maintain the session.

One or more of the elements, processes, and/or devices illustrated in FIG. 1 may be combined, divided, re-arranged, omitted, eliminated, and/or implemented in any other way. Further, the example streaming meter 102 and/or the central facility 110 of FIG. 1, may be implemented by hardware alone or by hardware in combination with software and/or firmware. Thus, for example, the streaming meter 102 and/or the central facility 110 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device (s) (PLD(s)), and/or field programmable logic device(s) (FPLD(s)) such as Field Programmable Gate Arrays (FPGAs). Further still, the example streaming meter 102 and/or the central facility 110 may include one or more elements, processes, and/or devices in addition to, or instead of, those illustrated in FIG. 1, and/or may include more than one of any or all of the illustrated elements, processes, and devices.

Example machine-readable instructions disclosed herein may be one or more executable programs or portion(s) of an executable program for execution by processor circuitry, such as the processor circuitry 212 shown in the example processor platform 200 discussed below in connection with FIG. 2 and/or the example processor circuitry discussed below in connection with FIGS. 3 and/or 4. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although an example program is described, many other methods of implementing the example streaming meter 102 and/or the example central facility 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine-readable instructions described herein may be stored in one or more of a compressed format, an encrypted format, a fragmented format, a compiled format, an executable format, a packaged format, etc. Machine-readable instructions as described herein may be stored as data or a data structure (e.g., as portions of instructions, code, representations of code, etc.) that may be utilized to create, manufacture, and/or produce machine executable instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions can require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions can be stored in multiple parts, which are individually compressed, encrypted, and/or stored on separate computing devices, wherein the parts when decrypted, decompressed, and/or combined form a set of machine executable instructions that implement one or more operations that can together form a program such as that described herein.

In another example, the machine-readable instructions can be stored in a state in which they can be read by processor circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions can need to be configured (e.g., settings stored, data input, network addresses recorded, etc.) before the machine-readable instructions and/or the corresponding program(s) can be executed in whole or in part. Thus, machine-readable media, as used herein, can include machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions can be represented using any of the following languages: C, C++, Java, C#, Perl, Python, JavaScript, HyperText Markup Language (HTML), Structured Query Language (SQL), Swift, etc.

As mentioned above, the example operations disclosed herein can be implemented using executable instructions (e.g., computer and/or machine-readable instructions) stored on one or more non-transitory computer and/or machine-readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine-readable medium, and non-transitory machine-readable storage medium are expressly defined to include any type of computer readable storage device and/or storage disk and to exclude propagating signals and to exclude transmission media. As used herein, the terms "computer readable storage device" and "machine-readable storage device" are defined to include any physical (mechanical and/or electrical) structure to store information, but to exclude propagating signals and to exclude transmission media. Examples of computer readable storage devices and machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or might not be configured by computer readable instructions, machine-readable instructions, etc., and/or manufactured to execute computer readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., can be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions can be implemented by, e.g., the same entity or object.

Additionally, although individual features can be included in different examples or claims, these can possibly be combined, and the inclusion in different examples or claims does not imply that a combination of features is not feasible and/or advantageous.

Figure 2:
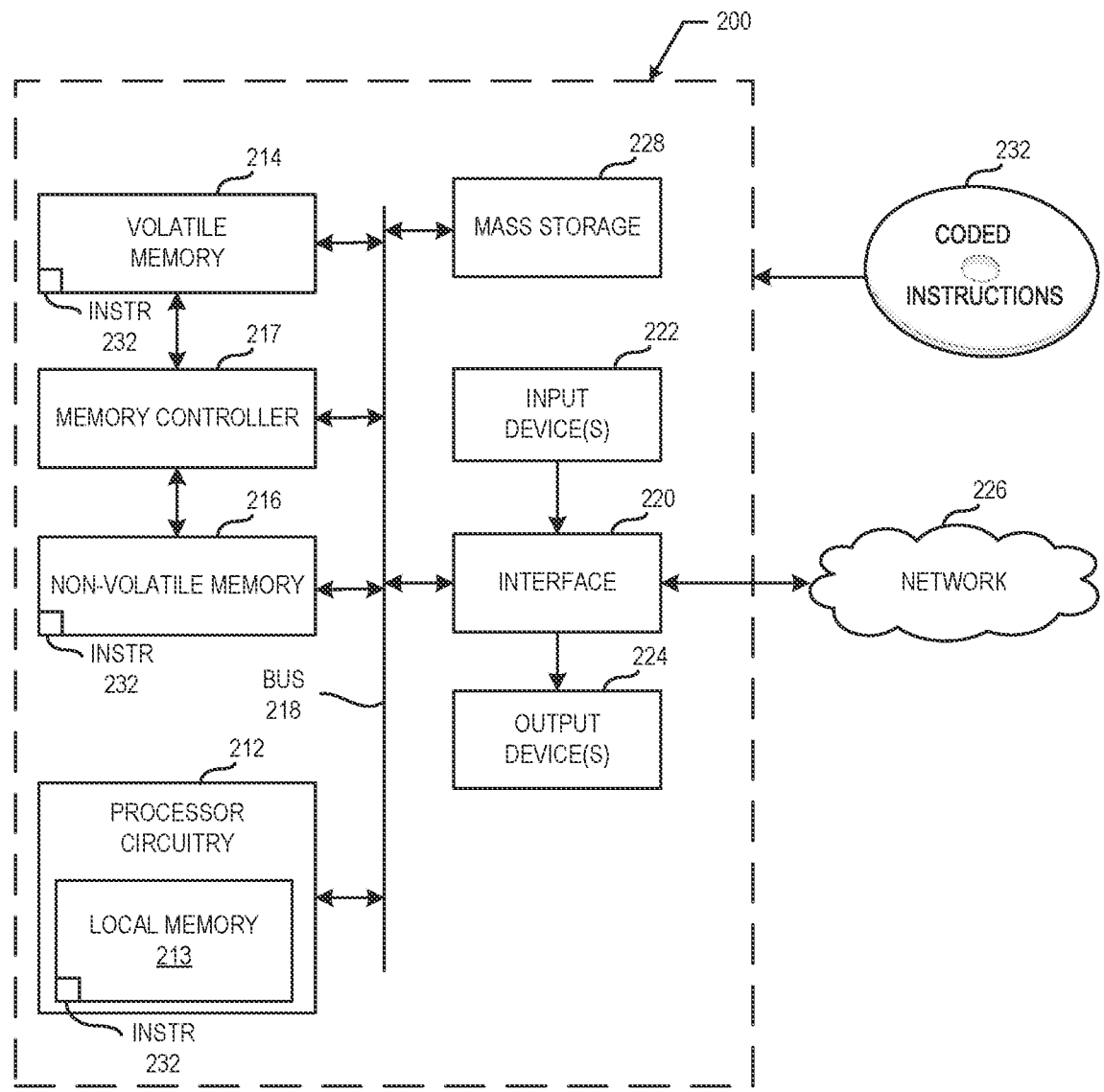
FIG. 2 is a block diagram of an example processor platform structured to execute and/or instantiate machine-readable instructions and/or operations to implement the streaming meter of FIG. 1.

FIG. 2 is a block diagram of an example processor platform 200 structured to execute and/or instantiate machine-readable instructions and/or operations to implement the streaming meter 102 and/or the central facility 110 of FIG. 1. The processor platform 200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 200 of the illustrated example includes processor circuitry 212. The processor circuitry 212 of the illustrated example is hardware. For example, the processor circuitry 212 can be implemented by one or more integrated circuits, logic circuits, FPGAs, microprocessors, CPUs, GPUs, DSPs, and/or microcontrollers from any desired family or manufacturer. The processor circuitry 212 can be implemented by one or more semiconductor based (e.g., silicon based) devices. In this example, the processor circuitry 212 implements components of the streaming meter 102 and/or the central facility 110.

The processor circuitry 212 of the illustrated example includes a local memory 213 (e.g., a cache, registers, etc.). The processor circuitry 212 of the illustrated example is in communication with a main memory including a volatile memory 214 and a non-volatile memory 216 by a bus 218. The volatile memory 214 can be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 216 can be implemented by flash memory and/or any other desired type of memory device. Access to the main memory 214, 216 of the illustrated example is controlled by a memory controller 217.

The processor platform 200 of the illustrated example also includes interface circuitry 220. The interface circuitry 220 can be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 222 are connected to the interface circuitry 220. The input device(s) 222 permit(s) a user to enter data and/or commands into the processor circuitry 212. The input device(s) 222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 224 are also connected to the interface circuitry 220 of the illustrated example. The output device(s) 224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 220 of the illustrated example, thus, typically includes a graphics driver card, a graphics driver chip, and/or graphics processor circuitry such as a GPU.

The interface circuitry 220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 226. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 200 of the illustrated example also includes one or more mass storage devices 228 to store software and/or data. Examples of such mass storage devices 228 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine-readable instructions 232, which can be implemented by machine-readable instructions disclosed herein, can be stored in the mass storage device 228, in the volatile memory 214, in the non-volatile memory 216, and/or on a removable non-transitory computer readable storage medium such as a CD or DVD.

Figure 3:
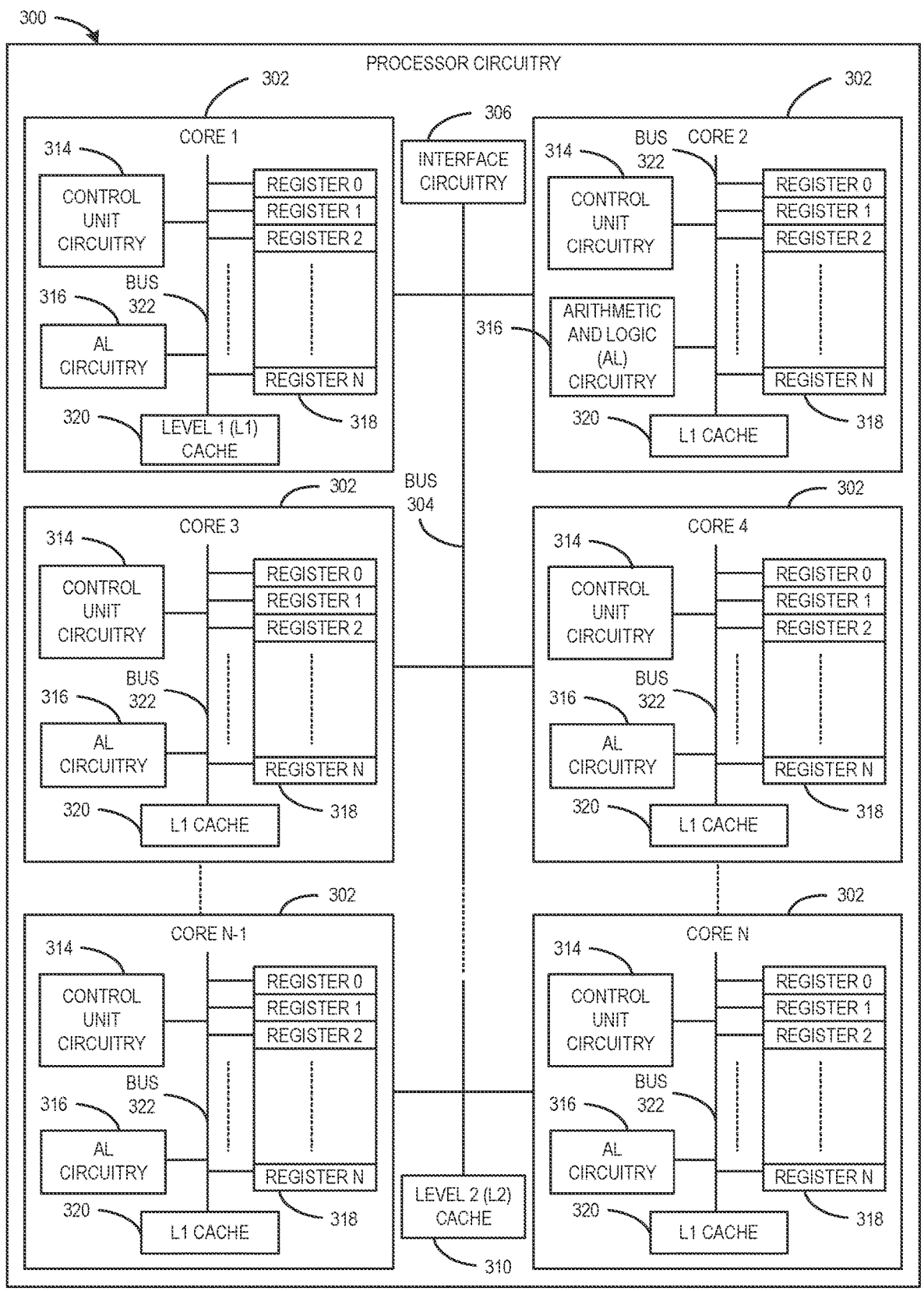
FIG. 3 is a block diagram of an example implementation of the processor circuitry of FIG. 2.

FIG. 3 is a block diagram of an example implementation of the processor circuitry 212 of FIG. 2. In this example, the processor circuitry 212 of FIG. 2 is implemented by a microprocessor 300. For example, the microprocessor 300 can be a general-purpose microprocessor (e.g., general-purpose microprocessor circuitry). The microprocessor 300 executes some or all of the machine-readable instructions disclosed herein to effectively instantiate the circuitry of FIGS. 1 and/or 2 as logic circuits to perform the operations corresponding to those machine-readable instructions. In some such examples, the circuitry of FIGS. 1 and/or 2 is instantiated by the hardware circuits of the microprocessor 300 in combination with the instructions. For example, the microprocessor 300 can be implemented by multi-core hardware circuitry such as a CPU, a DSP, a GPU, an XPU, etc. Although it can include any number of example cores 302 (e.g., 1 core), the microprocessor 300 of this example is a multi-core semiconductor device including N cores. The cores 302 of the microprocessor 300 can operate independently or can cooperate to execute machine-readable instructions. For example, machine code corresponding to a firmware program, an embedded software program, or a software program can be executed by one of the cores 302 or can be executed by multiple ones of the cores 302 at the same or different times. In some examples, the machine code corresponding to the firmware program, the embedded software program, or the software program is split into threads and executed in parallel by two or more of the cores 302. The software program can correspond to a portion or all of the machine-readable instructions and/or operations disclosed herein.

The cores 302 can communicate by a first example bus 304. In some examples, the first bus 304 can be implemented by a communication bus to effectuate communication associated with one(s) of the cores 302. For example, the first bus 304 can be implemented by at least one of an Inter-Integrated Circuit (I2C) bus, a Serial Peripheral Interface (SPI) bus, a PCI bus, or a PCIe bus. Additionally or alternatively, the first bus 304 can be implemented by any other type of computing or electrical bus. The cores 302 can obtain data, instructions, and/or signals from one or more external devices by example interface circuitry 306. The cores 302 can output data, instructions, and/or signals to the one or more external devices by the interface circuitry 306. Although the cores 302 of this example include example local memory 320 (e.g., Level 1 (L1) cache that can be split into an L1 data cache and an L1 instruction cache), the microprocessor 300 also includes example shared memory 310 that can be shared by the cores (e.g., Level 2 (L2 cache)) for high-speed access to data and/or instructions. Data and/or instructions can be transferred (e.g., shared) by writing to and/or reading from the shared memory 310. The local memory 320 of each of the cores 302 and the shared memory 310 can be part of a hierarchy of storage devices including multiple levels of cache memory and the main memory (e.g., the main memory 214, 216 of FIG. 2). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 302 can be referred to as a CPU, DSP, GPU, etc., or any other type of hardware circuitry. Each core 302 includes control unit circuitry 314, arithmetic and logic (AL) circuitry (sometimes referred to as an ALU) 316, a plurality of registers 318, the local memory 320, and a second example bus 322. Other structures can be present. For example, each core 302 can include vector unit circuitry, single instruction multiple data (SIMD) unit circuitry, load/store unit (LSU) circuitry, branch/jump unit circuitry, floating-point unit (FPU) circuitry, etc. The control unit circuitry 314 includes semiconductor-based circuits structured to control (e.g., coordinate) data movement within the corresponding core 302. The AL circuitry 316 includes semiconductor-based circuits structured to perform one or more mathematical and/or logic operations on the data within the corresponding core 302. The AL circuitry 316 of some examples performs integer based operations. In other examples, the AL circuitry 316 also performs floating point operations. In yet other examples, the AL circuitry 316 can include first AL circuitry that performs integer based operations and second AL circuitry that performs floating point operations. In some examples, the AL circuitry 316 can be referred to as an Arithmetic Logic Unit (ALU). The registers 318 are semiconductor-based structures to store data and/or instructions such as results of one or more of the operations performed by the AL circuitry 316 of the corresponding core 302. For example, the registers 318 can include vector register(s), SIMD register(s), general-purpose register(s), flag register(s), segment register(s), machine-specific register(s), instruction pointer register(s), control register(s), debug register(s), memory management register(s), machine check register(s), etc. The registers 318 can be arranged in a bank as shown in FIG. 3. Alternatively, the registers 318 can be organized in any other arrangement, format, or structure including distributed throughout the core 302 to shorten access time. The second bus 322 can be implemented by at least one of an I2C bus, a SPI bus, a PCI bus, or a PCIe bus Each core 302 and/or, more generally, the microprocessor 300 can include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry can be present. The microprocessor 300 is a semiconductor device fabricated to include many transistors interconnected to implement the structures described above in one or more integrated circuits (ICs) contained in one or more packages. The processor circuitry can include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators can be on-board the processor circuitry, in the same chip package as the processor circuitry and/or in one or more separate packages from the processor circuitry.

Figure 4:
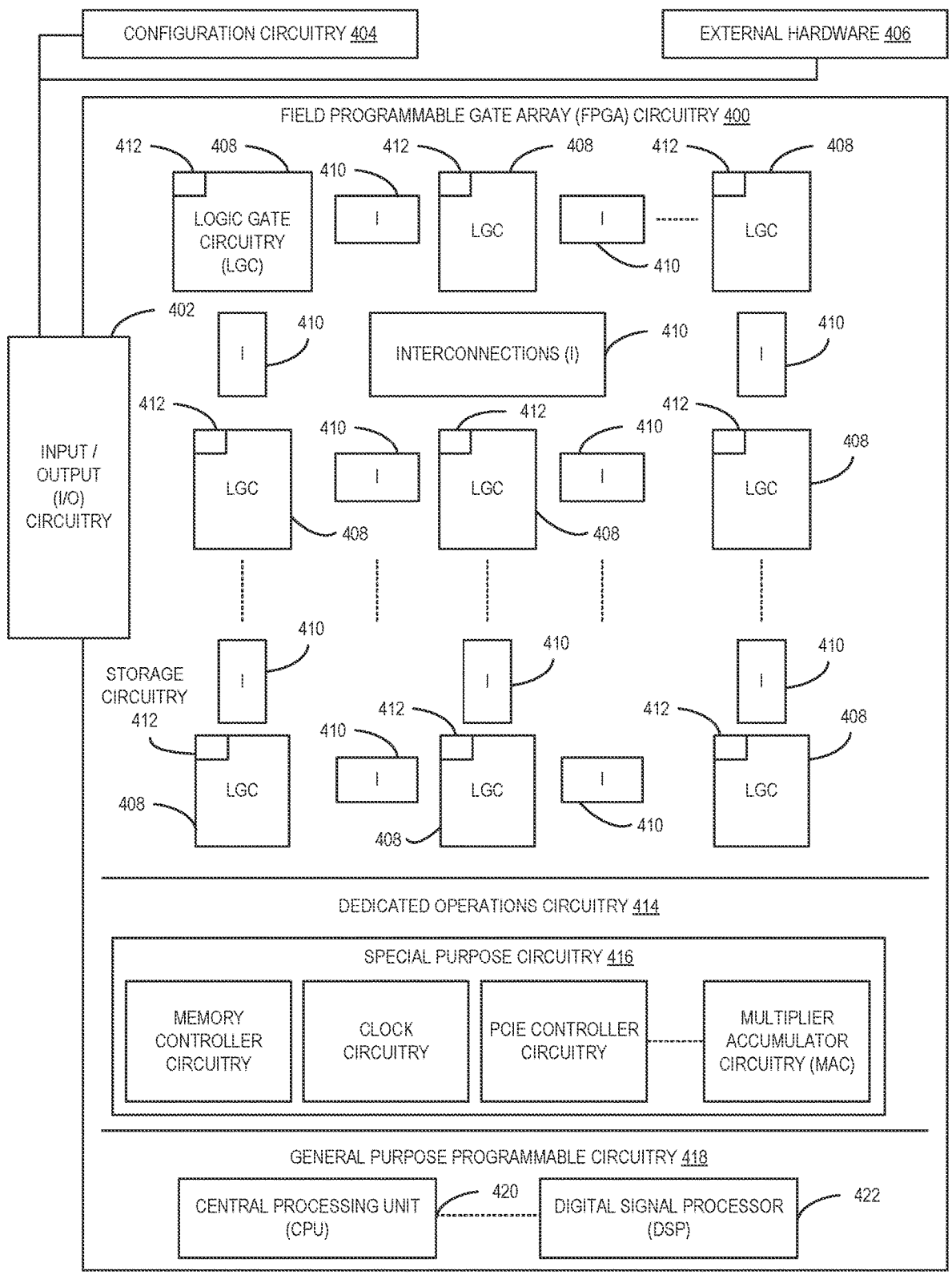
FIG. 4 is a block diagram of another example implementation of the processor circuitry of FIG. 2.

FIG. 4 is a block diagram of another example implementation of the processor circuitry 212 of FIG. 2. In this example, the processor circuitry 212 is implemented by FPGA circuitry 400. For example, the FPGA circuitry 400 can be implemented by an FPGA. The FPGA circuitry 400 can be used, for example, to perform operations that could otherwise be performed by the example microprocessor 300 of FIG. 3 executing corresponding machine-readable instructions. However, once configured, the FPGA circuitry 400 instantiates the machine-readable instructions in hardware and, thus, can often execute the operations faster than they could be performed by a general purpose microprocessor executing the corresponding software.

More specifically, in contrast to the microprocessor 300 of FIG. 3 described above (which is a general purpose device that can be programmed to execute some or all of the machine-readable instructions disclosed herein but whose interconnections and logic circuitry are fixed once fabricated), the FPGA circuitry 400 of the example of FIG. 4 includes interconnections and logic circuitry that can be configured and/or interconnected in different ways after fabrication to instantiate, for example, some or all of the machine-readable instructions disclosed herein. In particular, the FPGA circuitry 400 can be thought of as an array of logic gates, interconnections, and switches. The switches can be programmed to change how the logic gates are interconnected by the interconnections, effectively forming one or more dedicated logic circuits (unless and until the FPGA circuitry 400 is reprogrammed). The configured logic circuits enable the logic gates to cooperate in different ways to perform different operations on data received by input circuitry. Those operations can correspond to some or all of the software disclosed herein. As such, the FPGA circuitry 400 can be structured to effectively instantiate some or all of the machine-readable instructions disclosed herein as dedicated logic circuits to perform the operations corresponding to those software instructions in a dedicated manner analogous to an ASIC. Therefore, the FPGA circuitry 400 can perform the operations corresponding to the some or all of the machine-readable instructions disclosed herein faster than the general-purpose microprocessor can execute the same.

In the example of FIG. 4, the FPGA circuitry 400 is structured to be programmed (and/or reprogrammed one or more times) by an end user by a hardware description language (HDL) such as Verilog. The FPGA circuitry 400 of FIG. 4, includes example input/output (I/O) circuitry 402 to obtain and/or output data to/from example configuration circuitry 404 and/or external hardware 406. For example, the configuration circuitry 404 can be implemented by interface circuitry that can obtain machine-readable instructions to configure the FPGA circuitry 400, or portion(s) thereof. In some such examples, the configuration circuitry 404 can obtain the machine-readable instructions from a user, a machine (e.g., hardware circuitry (e.g., programmed or dedicated circuitry) that can implement an Artificial Intelligence/Machine Learning (AI/ML) model to generate the instructions), etc. In some examples, the external hardware 406 can be implemented by external hardware circuitry. For example, the external hardware 406 can be implemented by the microprocessor 300 of FIG. 3. The FPGA circuitry 400 also includes an array of example logic gate circuitry 408, a plurality of example configurable interconnections 410, and example storage circuitry 412. The logic gate circuitry 408 and the configurable interconnections 410 are configurable to instantiate one or more operations that can correspond to at least some of the machine-readable instructions disclosed herein and/or other desired operations. The logic gate circuitry 408 shown in FIG. 4 is fabricated in groups or blocks. Each block includes semiconductor-based electrical structures that can be configured into logic circuits. In some examples, the electrical structures include logic gates (e.g., AND gates, OR gates, NOR gates, etc.) that provide basic building blocks for logic circuits. Electrically controllable switches (e.g., transistors) are present within each of the logic gate circuitry 408 to enable configuration of the electrical structures and/or the logic gates to form circuits to perform desired operations. The logic gate circuitry 408 can include other electrical structures such as look-up tables (LUTs), registers (e.g., flip-flops or latches), multiplexers, etc.

The configurable interconnections 410 of the illustrated example are conductive pathways, traces, vias, or the like that can include electrically controllable switches (e.g., transistors) whose state can be changed by programming (e.g., using an HDL instruction language) to activate or deactivate one or more connections between one or more of the logic gate circuitry 408 to program desired logic circuits.

The storage circuitry 412 of the illustrated example is structured to store result(s) of the one or more of the operations performed by corresponding logic gates. The storage circuitry 412 can be implemented by registers or the like. In the illustrated example, the storage circuitry 412 is distributed amongst the logic gate circuitry 408 to facilitate access and increase execution speed.

The example FPGA circuitry 400 of FIG. 4 also includes example Dedicated Operations Circuitry 414. In this example, the Dedicated Operations Circuitry 414 includes special purpose circuitry 416 that can be invoked to implement commonly used functions to avoid the need to program those functions in the field. Examples of such special purpose circuitry 416 include memory (e.g., DRAM) controller circuitry, PCIe controller circuitry, clock circuitry, transceiver circuitry, memory, and multiplier-accumulator circuitry. Other types of special purpose circuitry can be present. In some examples, the FPGA circuitry 400 can also include example general-purpose programmable circuitry 418 such as an example CPU 420 and/or an example DSP 422. Other general-purpose programmable circuitry 418 can additionally or alternatively be present such as a GPU, an XPU, etc., that can be programmed to perform other operations.

Although FIGS. 3 and 4 illustrate two example implementations of the processor circuitry 212 of FIG. 2, many other approaches are contemplated. For example, as mentioned above, modern FPGA circuitry can include an on-board CPU, such as one or more of the example CPU 420 of FIG. 4. Therefore, the processor circuitry 212 of FIG. 2 can additionally be implemented by combining the example microprocessor 300 of FIG. 3 and the example FPGA circuitry 400 of FIG. 4. In some such hybrid examples, a first portion of the machine-readable instructions disclosed herein can be executed by one or more of the cores 302 of FIG. 3, a second portion of the machine-readable instructions disclosed herein can be executed by the FPGA circuitry 400 of FIG. 4, and/or a third portion of the machine-readable instructions disclosed herein can be executed by an ASIC. It should be understood that some or all of the circuitry of FIGS. 1 and/or 2 can, thus, be instantiated at the same or different times. Some or all of the circuitry can be instantiated, for example, in one or more threads executing concurrently and/or in series. Moreover, in some examples, some or all of the circuitry of FIGS. 1 and/or 2 can be implemented within one or more virtual machines and/or containers executing on the microprocessor.

In some examples, the processor circuitry 212 of FIG. 2 can be in one or more packages. For example, the microprocessor 300 of FIG. 3 and/or the FPGA circuitry 400 of FIG. 4 can be in one or more packages. In some examples, an XPU can be implemented by the processor circuitry 212 of FIG. 2, which can be in one or more packages. For example, the XPU can include a CPU in one package, a DSP in another package, a GPU in yet another package, and an FPGA in still yet another package.

Figure 5:
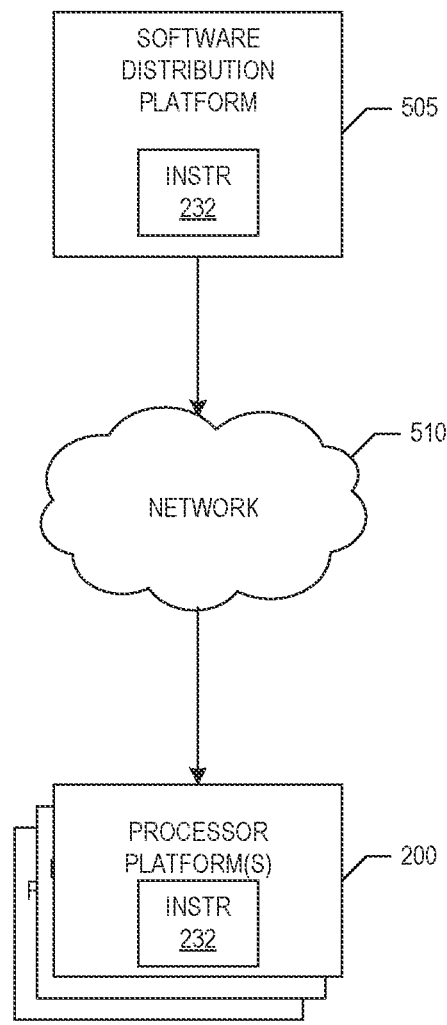
FIG. 5 is a block diagram of an example software distribution platform (e.g., one or more servers) to distribute software (e.g., software corresponding to example machine-readable instructions) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 505 to distribute software such as the example machine-readable instructions 232 of FIG. 2 to hardware devices owned and/or operated by third parties is illustrated in FIG. 5. The example software distribution platform 505 can be implemented by any computer server, data facility, cloud service, etc., capable of storing and transmitting software to other computing devices. The third parties can be customers of the entity owning and/or operating the software distribution platform 505. For example, the entity that owns and/or operates the software distribution platform 505 can be a developer, a seller, and/or a licensor of software such as the example machine-readable instructions 232 of FIG. 2. The third parties can be consumers, users, retailers, OEMs, etc., who purchase and/or license the software for use and/or re-sale and/or sub-licensing. In the illustrated example, the software distribution platform 505 includes one or more servers and one or more storage devices. The storage devices store the machine-readable instructions 232, which can correspond to example machine-readable instructions disclosed herein, as described above. The one or more servers of the example software distribution platform 505 are in communication with an example network 510, which can correspond to any one or more of the Internet and/or any of the example networks described above such as the WAN 108 and/or the LAN 114. In some examples, the one or more servers are responsive to requests to transmit the software to a requesting party as part of a commercial transaction. Payment for the delivery, sale, and/or license of the software can be handled by the one or more servers of the software distribution platform and/or by a third-party payment entity. The servers enable purchasers and/or licensors to download the machine-readable instructions 232 from the software distribution platform 505. For example, the software, which can correspond to example machine-readable instructions disclosed herein, can be downloaded to the example processor platform 200, which is to execute the machine-readable instructions 232 to implement the streaming meter 102 and/or the central facility 110. In some examples, one or more servers of the software distribution platform 505 periodically offer, transmit, and/or force updates to the software (e.g., the example machine-readable instructions 232 of FIG. 2) to ensure improvements, patches, updates, etc., are distributed and applied to the software at the end user devices.

Figure 6:
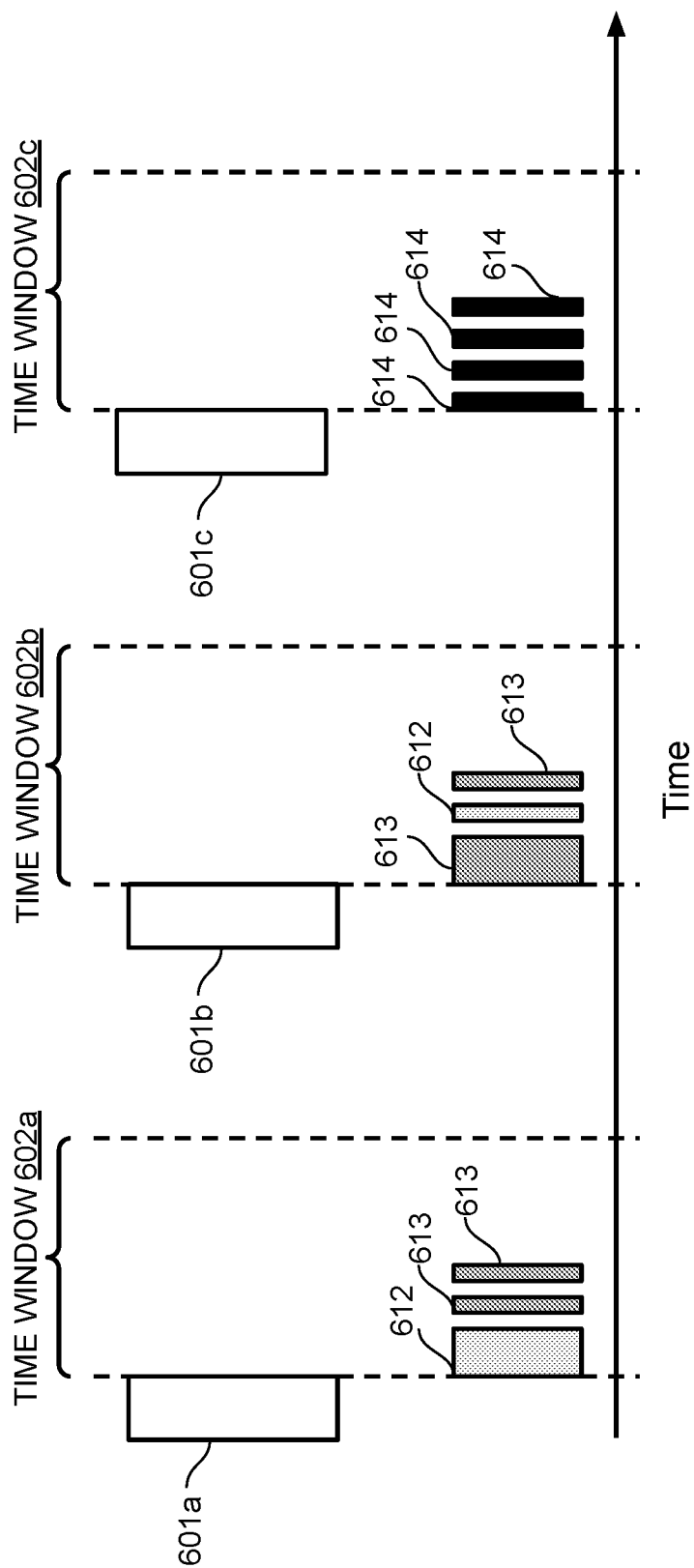
FIG. 6 is an illustration of example data packets detected during a monitoring interval.

FIG. 6 is an illustration of example data packets that are detected, or received, by the streaming meter 102 during a monitoring interval in order to monitor network traffic data associated with a client device 116 at a media exposure measurement location 104.

As described above, the streaming meter 102 monitors network traffic data at the media exposure measurement location 104 to correlate media presented at the client device 116 at the media exposure measurement location 104 with a device identifier (e.g., IP/MAC address, or any other appropriate type of device identifier) of the client device 116. In this manner, the streaming meter 102 can generate exposure metrics that map media presented at the client device 116 with, e.g., identity and/or demographic information of a panelist associated with the client device 116.

As illustrated in FIG. 6, the streaming meter 102 monitors network traffic data over the monitoring interval (e.g., a time interval) that includes a sequence of time windows, e.g., a first time window 602a, a second time window 602b, and a third time window 602c. Generally, the monitoring interval can include any appropriate number of time windows, and each time window can include any appropriate length of time.

The streaming meter 102 monitors network traffic data by detecting a data packet 601a transmitted through a WAN (referred to as a WAN data packet). The WAN data packet 601a represents media presented at the client device 116 at the media exposure measurement location 104. After detecting the WAN data packet 601a, the streaming meter 102 detects one or more additional data packets transmitted through a local area network (referred to as one or more LAN data packets) within the first time window 602a. Each of the LAN data packets can specify, or otherwise be associated with, a device identifier. By correlating the WAN data packet with one or more LAN data packets, the streaming meter 102 can map the media presented at the client device 116 with the device identifier.

For example, as illustrated in FIG. 6, within the first time window 602a after detection of the WAN data packet 601a, the streaming meter 102 detects one LAN data packet associated with a first device identifier 612, and two LAN data packets associated with a second device identifier 613. In some cases, the streaming meter 102 doesn't detect any LAN data packets within the first time window 602a. In other words, the streaming meter 102 can detect the WAN data packet 601a and not detect any LAN data packets within the threshold amount of time defined by the first time window 602a.

As illustrated in FIG. 6, the streaming meter 102 can detect another WAN data packet 601b at a later time. This can initiate a second time window 602b from the detection of the WAN data packet 601b during which the streaming meter 102 can detect one or more LAN data packets. In the example illustrated in FIG. 6, within the second time window 602b in the monitoring interval, the streaming meter 102 detects one LAN data packet associated with the first device identifier 612, and two LAN data packets associated with the second device identifier 613.

Similarly as described above, the detection of another WAN data packet 601c at a later time can initiate a third time window 602c during which the streaming meter 102 detects one or more additional LAN data packets. In the example illustrated in FIG. 6, within the third time window 602c in the monitoring interval, the streaming meter 102 detects four LAN data packets, where each LAN data packet is associated with the same device identifier, e.g., the third device identifier 614. Generally, the WAN data packets and the LAN data packets can carry any appropriate amount of data (which can be different between the data packets), and the aforementioned process is not dependent on the packet size.

The streaming meter 102 can terminate the aforementioned process of monitoring network traffic data when a termination criterion has been satisfied. The termination criterion can be any appropriate criterion. In one example, the termination criterion can specify a particular number of WAN data packets to be detected, or a particular number of time windows in the monitoring interval. In another example, the termination criterion can specify a total length of time included in the monitoring interval.

After the termination criterion has been satisfied, the streaming meter 102 generates a score for each device identifier based on the number of LAN data packets associated with that device identifier that are detected within the monitoring interval. The score can be a composite score that is a linear combination of a plain score and a unique score, each weighted by a respective weight factor, e.g., as illustrated by Equation 1 above. In the example of FIG. 6, the streaming meter 102 can generate a non-zero plain score for both the first time window 602a and the second time window 602b, because in each of these time windows 602a, 602b the streaming meter 102 detected LAN data packets that are associated with different device identifiers.

In other words, in both of the time windows 602a, 602b, LAN data packets associated with the first device identifier 612 and the second device identifier 613 have been detected concurrently. By contrast, the streaming meter 102 can generate a non-zero unique score for the third time window 602c, because during this time window, the streaming meter 102 detected LAN data packets that are associated with the same device identifier—the third device identifier 614, while no LAN data packets associated with other device identifiers have been detected during the third time window 602c.

Based on the score (e.g., the composite score), the streaming meter 102 can select from the device identifiers 612, 613, and 614, a target device identifier, e.g., a device identifier that is most likely to match the device identifier of the client device 116 that is presenting media at the media exposure measurement location 104. As a particular example, because the third device identifier 614 was detected uniquely during the third time window 602c, the third device identifier 614 can have the highest composite score with the unique score having a higher weight than the plain score. Therefore, in this example, the streaming meter 102 can select the third device identifier 614 as the target device identifier, e.g., a device identifier having the highest composite score.

An example method for monitoring network traffic data is described in more detail next.

Figure 7:
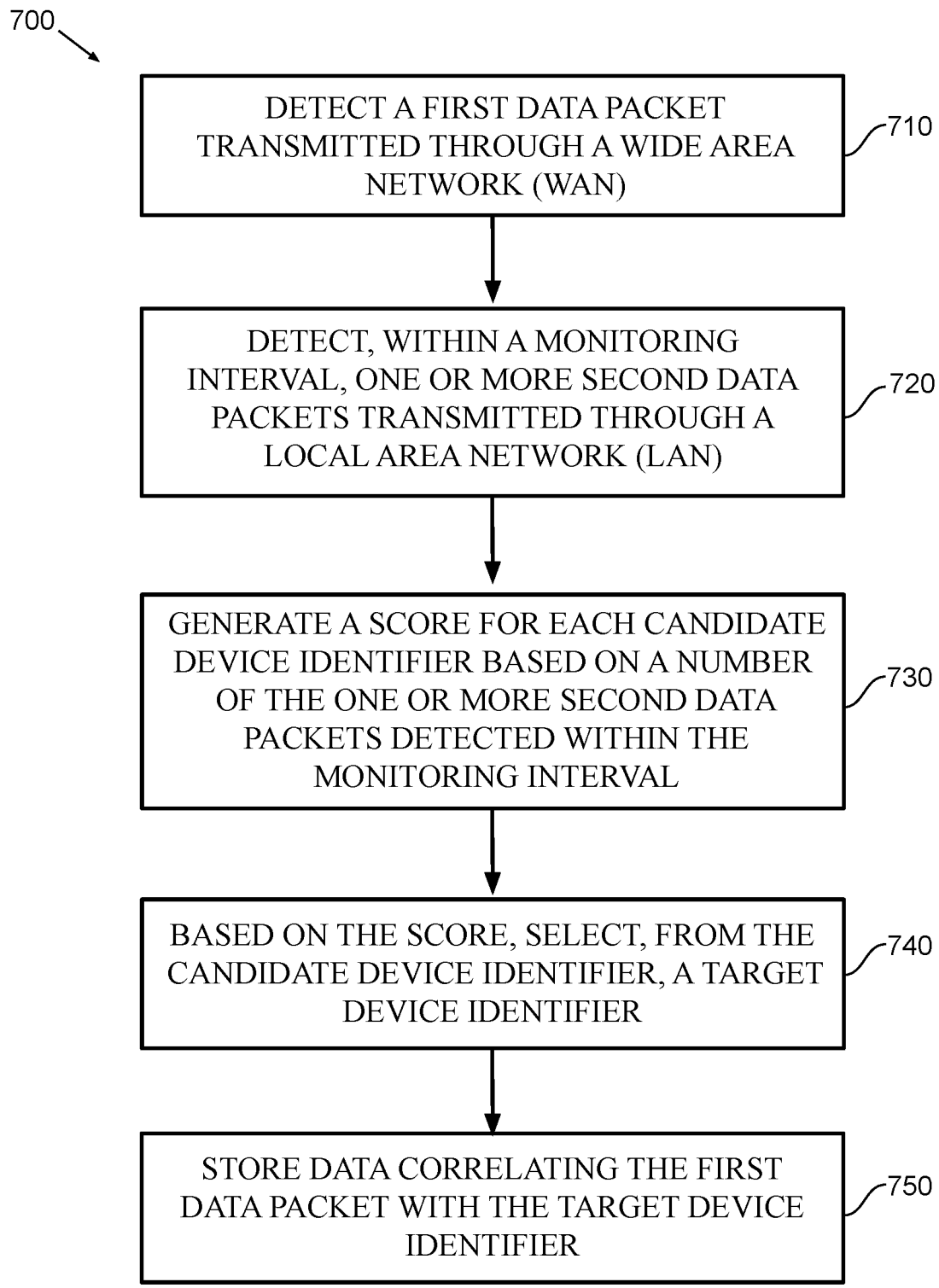
FIG. 7 is a flow diagram of an example method for monitoring network traffic data.

FIG. 7 is a flow diagram of an example method 700 for monitoring network traffic data. The method 700 can be performed by the streaming meter 102 and/or the central facility 110, or any other component, or a combination of components, described above with reference to FIG. 1-FIG. 6.

At block 710, the method includes detecting a first data packet transmitted through a WAN. The first data packet can represent media presented at a client device 116 at the media exposure measurement location 104. In some implementations, the media exposure measurement location 104 can include multiple client devices, each client device having a respective device identifier (e.g., a media access control (MAC) address).

At block 720, the method includes detecting, within a monitoring interval, one or more second data packets transmitted through a LAN. Each of the one or more second data packets can be, e.g., control data packets, and can specify a candidate device identifier. The monitoring interval includes a time window from the detection of the first data packet.

At block 730, the method includes generating a score for each candidate device identifier based on a number of the one or more second data packets detected within the monitoring interval.

At block 740, the method includes selecting, based on the score, from the candidate device identifiers, a target device identifier. In some implementations, the method can include selecting a candidate device identifier having the highest score as the target device identifier.

At block 750, the method includes storing data correlating the first data packet representing the media presented at the client device 116 at the media exposure measurement location 104 with the target device identifier.

In some implementations, the method further includes transmitting the data to a remote server via a network interface, and analyzing, at the remote server, the data to generate exposure metrics associated with the media presented at the client device 116 at the media exposure measurement location 104.

In some implementations, detecting the first data packet transmitted through the WAN includes: collecting, via a wired connection with an access point (AP) associated with the WAN, network traffic data transmitted through the WAN, and analyzing the network traffic data to detect the first data packet.

In some implementations, the network traffic data corresponds to an outbound network traffic from the client device 116 at the media exposure measurement location 104. The outbound network traffic can be initiated by, e.g., an action of a user of the client device 116 at the media exposure measurement location 104.

In some implementations, detecting, within the monitoring interval, the one or more second data packets transmitted through the LAN includes: collecting, via a wireless connection with the LAN, network traffic data transmitted through the LAN, and analyzing the network traffic data to detect the one or more second data packets.

In some implementations, the monitoring interval includes a sequence of time windows, each time window beginning at a respective time at which a corresponding respective first data packet is detected. In such cases, detecting, within the monitoring interval, the one or more second data packets includes: detecting the one or more second data packets for each time window in the sequence of time windows.

In some implementations, generating the score for each candidate device identifier based on the number of the one or more second data packets detected within the monitoring interval includes: generating the score for each candidate device identifier as a composite score that is a linear combination of a plain score and a unique score each weighted by a respective weight factor. For each candidate device identifier, the plain score can represent a count of the one or more second data packets specifying the candidate device identifier detected concurrently with second data packets associated with the other candidate device identifiers.

For each candidate device identifier, the unique score can represent a count of the one or more second data packets associated with the candidate device identifier detected without concurrently detecting second data packets associated with the other candidate device identifiers. In some cases, a weight factor of the unique score is larger than a weight factor of the plain score.

In some implementations, generating the score for each candidate device identifier includes: generating the composite score for an inbound network traffic to the client device 116 at the media exposure measurement location 104, generating the composite score for an outbound network traffic from the client device 116 at the media exposure measurement location 104, and generating the composite score as a linear combination of the composite score for the inbound network traffic and the composite score for the outbound network traffic.

In some implementations, the composite score for the inbound network traffic is weighted by an inbound weight factor and the composite score for the outbound network traffic is weighted by an outbound weight factor, where the outbound weight factor is larger than the inbound weight factor.

In some implementations, the data packets transmitted through the LAN are encrypted and the data packets transmitted through the WAN are unencrypted.

In some implementations, the LAN is a wireless local area network (WLAN) configured as a mesh network. In such cases, the mesh network can include: a main node, and multiple mesh nodes, each mesh node being communicatively coupled to the main node and to each other mesh node.

From the foregoing, it will be appreciated that example systems, methods, apparatus, and articles of manufacture have been disclosed that monitor encrypted network traffic data. Disclosed methods, apparatus, and articles of manufacture improve identification of encrypted media without requiring decryption of the media. Additionally, disclosed systems, methods, apparatus, and articles of manufacture improve the efficiency of using a computing device by increasing the monitoring range of a streaming meter and allowing for media monitoring via network traffic without packet injection (e.g., therefore not requiring the most up-to-date WiFi cards). Disclosed systems, methods, apparatus, and articles of manufacture are accordingly directed to one or more improvement(s) in the operation of a machine such as a computer or other electronic and/or mechanical device.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A method for monitoring network traffic data at a media exposure measurement location, the method comprising:
   detecting a wide area network (WAN) data packet transmitted through a WAN, the WAN data packet representing media presented at a client device of a plurality of client devices at the media exposure measurement location, each client device of the plurality of client devices having a respective device identifier;
   detecting, within a monitoring interval from the detection of the WAN data packet, one or more local area network (LAN) data packets transmitted through a LAN, each of the one or more LAN data packets specifying a candidate device identifier of a respective one of the plurality of client devices;
   generating a score for each candidate device identifier based on a number of the one or more LAN data packets detected within the monitoring interval from the detection of the WAN data packet, wherein the score represents a likelihood that the client device having the candidate device identifier is the client device to which the WAN data packet was transmitted;
based on the scores and based on the one or more LAN data packets having been detected within the monitoring interval from the detection of the WAN data packet, selecting, from the candidate device identifiers, a target device identifier with which to correlate the WAN data packet; and
storing data correlating the selected target device identifier with the WAN data packet representing the media presented at the client device of the plurality of client devices at the media exposure measurement location.

2. The method of claim 1, further comprising:
transmitting the data to a remote server via a network interface; and
analyzing, at the remote server, the data to generate exposure metrics associated with the media presented at the client device at the media exposure measurement location.

3. The method of claim 1, wherein detecting the WAN data packet transmitted through the WAN comprises:
collecting, via a wired connection with an access point (AP) associated with the WAN, network traffic data transmitted through the WAN; and
analyzing the network traffic data to detect the WAN data packet.

4. The method of claim 3, wherein the network traffic data corresponds to an outbound network traffic from the client device at the media exposure measurement location.

5. The method of claim 4, wherein the outbound network traffic is initiated by an action of a user of the client device at the media exposure measurement location.

6. The method of claim 1, wherein detecting, within the monitoring interval, the one or more LAN data packets transmitted through the LAN comprises:
collecting, via a wireless connection with the LAN, network traffic data transmitted through the LAN; and
analyzing the network traffic data to detect the one or more se Cond-LAN data packets.

7. The method of claim 1, wherein the one or more LAN data packets transmitted through the LAN are control data packets.

8. The method of claim 1, wherein the monitoring interval comprises a sequence of time windows, each time window beginning at a respective time at which a corresponding respective WAN data packet is detected, and wherein detecting, within the monitoring interval, the one or more LAN data packets comprises:
detecting the one or more LAN data packets for each time window in the sequence of time windows.

9. The method of claim 1, wherein selecting the target device identifier based on the scores comprises:
selecting a candidate device identifier having the highest score as the target device identifier.

10. The method of claim 1, wherein generating the score for each candidate device identifier based on the number of the one or more LAN data packets detected within the monitoring interval comprises:
generating the score for each candidate device identifier as a composite score that is a linear combination of a plain score and a unique score each weighted by a respective weight factor.

11. The method of claim 10, wherein, for each candidate device identifier:
i) the plain score represents a count of the one or more LAN data packets specifying the candidate device identifier detected concurrently with LAN data packets associated with the other candidate device identifiers, and
ii) the unique score represents a count of the one or more LAN data packets associated with the candidate device identifier detected without concurrently detecting LAN data packets associated with the other candidate device identifiers.

12. The method of claim 10, wherein a weight factor of the unique score is larger than a weight factor of the plain score.

13. The method of claim 10, wherein generating the score for each candidate device identifier as the composite score that is the linear combination of the plain score and the unique score each weighted by the respective weight factor comprises:
generating the composite score for an inbound network traffic to the client device at the media exposure measurement location;
generating the composite score for an outbound network traffic from the client device at the media exposure measurement location; and
generating the composite score as a linear combination of the composite score for the inbound network traffic and the composite score for the outbound network traffic.

14. The method of claim 13, wherein the composite score for the inbound network traffic is weighted by an inbound weight factor and the composite score for the outbound network traffic is weighted by an outbound weight factor, wherein the outbound weight factor is larger than the inbound weight factor.

15. The method of claim 1, wherein the device identifier comprises a media access control (MAC) address.

16. The method of claim 1, wherein the data packets transmitted through the LAN are encrypted and wherein the data packets transmitted through the WAN are unencrypted.

17. The method of claim 1, wherein the LAN is a wireless local area network (WLAN) configured as a mesh network, and wherein the mesh network comprises nodes including:
i) a main node, and
ii) a plurality of mesh nodes, each mesh node being communicatively coupled to the main node and to each other mesh node of the plurality of mesh nodes, and
wherein detecting, within the monitoring interval, the one or more LAN data packets transmitted through the LAN comprises detecting, within the monitoring interval, one or more LAN data packets transmitted between the nodes of the LAN.

18. A non-transitory computer-readable storage medium, having stored thereon machine-readable instructions that, upon execution by a processor, cause performance of operations comprising:
detecting a wide area network (WAN) data packet transmitted through a WAN, the WAN data packet representing media presented at a client device of a plurality of client devices at a media exposure measurement location, each client device of the plurality of client devices having a respective device identifier;
detecting, within a monitoring interval from the detection of the WAN data packet, one or more local area network (LAN) data packets transmitted through a LAN, each of the one or more LAN data packets specifying a candidate device identifier of a respective one of the plurality of client devices;
generating a score for each candidate device identifier based on a number of the one or more LAN data packets detected within the monitoring interval from the detection of the WAN data packet, wherein the score represents a likelihood that the client device having the candidate device identifier is the client device to which the WAN data packet was transmitted;

based on the scores and based on the one or more LAN data packets having been detected within the monitoring interval from the detection of the WAN data packet, selecting, from the candidate device identifiers, a target device identifier with which to correlate the WAN data packet; and storing data correlating the selected target device identifier with the WAN data packet representing the media presented at the client device of the plurality of client devices at the media exposure measurement location.

19. The non-transitory computer-readable storage medium of claim 18, the operations further comprising:

transmitting the data to a remote server via a network interface; and analyzing, at the remote server, the data to generate exposure metrics associated with the media presented at the client device at the media exposure measurement location.

20. A computing system comprising:

a processor; and a non-transitory computer-readable storage medium, having stored thereon machine-readable instructions that, upon execution by the processor, cause performance of operations comprising:

detecting a wide area network (WAN) data packet transmitted through a WAN, the WAN data packet representing media presented at a client device of a plurality of client devices at a media exposure measurement location, each client device of the plurality of client devices having a respective device identifier;

detecting, within a monitoring interval from the detection of the WAN data packet, one or more local area network (LAN) data packets transmitted through a LAN, each of the one or more LAN data packets specifying a candidate device identifier of a respective one of the plurality of client devices;

generating a score for each candidate device identifier based on a number of the one or more LAN data packets detected within the monitoring interval from the detection of the WAN data packet, wherein the score represents a likelihood that the client device having the candidate device identifier is the client device to which the WAN data packet was transmitted;

based on the scores and based on the one or more LAN data packets having been detected within the monitoring interval from the detection of the WAN data packet, selecting, from the candidate device identifiers, a target device identifier with which to correlate the WAN data packet; and storing data correlating the selected target device identifier with the WAN data packet representing the media presented at the client device of the plurality of client devices at the media exposure measurement location.

* * * * *